(No Model.) 2 Sheets—Sheet 2.
G. W. PRENTICE.
BUTTON FASTENING MACHINE.
No. 359,631. Patented Mar. 22, 1887.
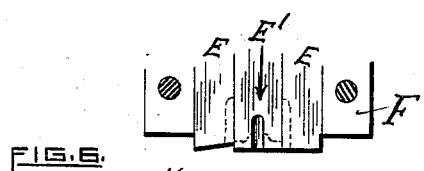
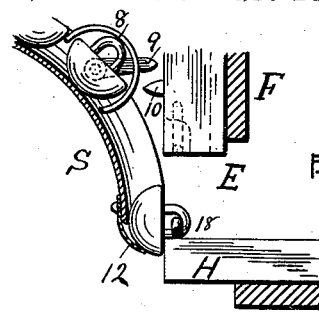
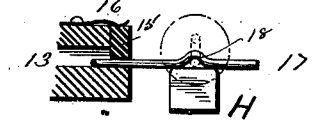
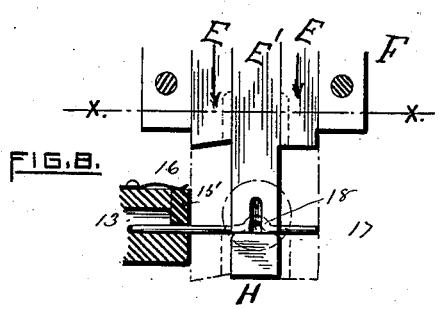
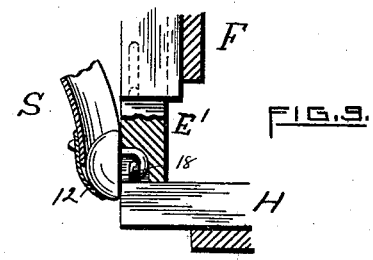
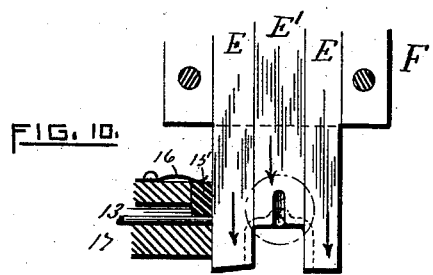
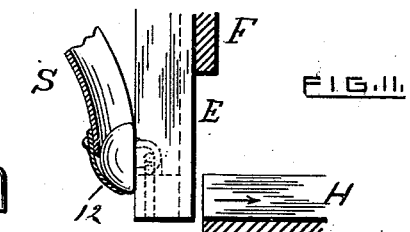
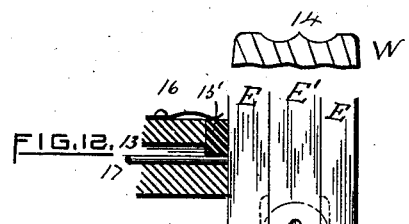
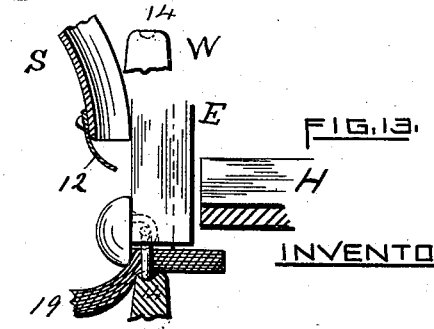
WITNESSES
F. A. Smith
Charles Neene
INVENTOR
George W. Prentice

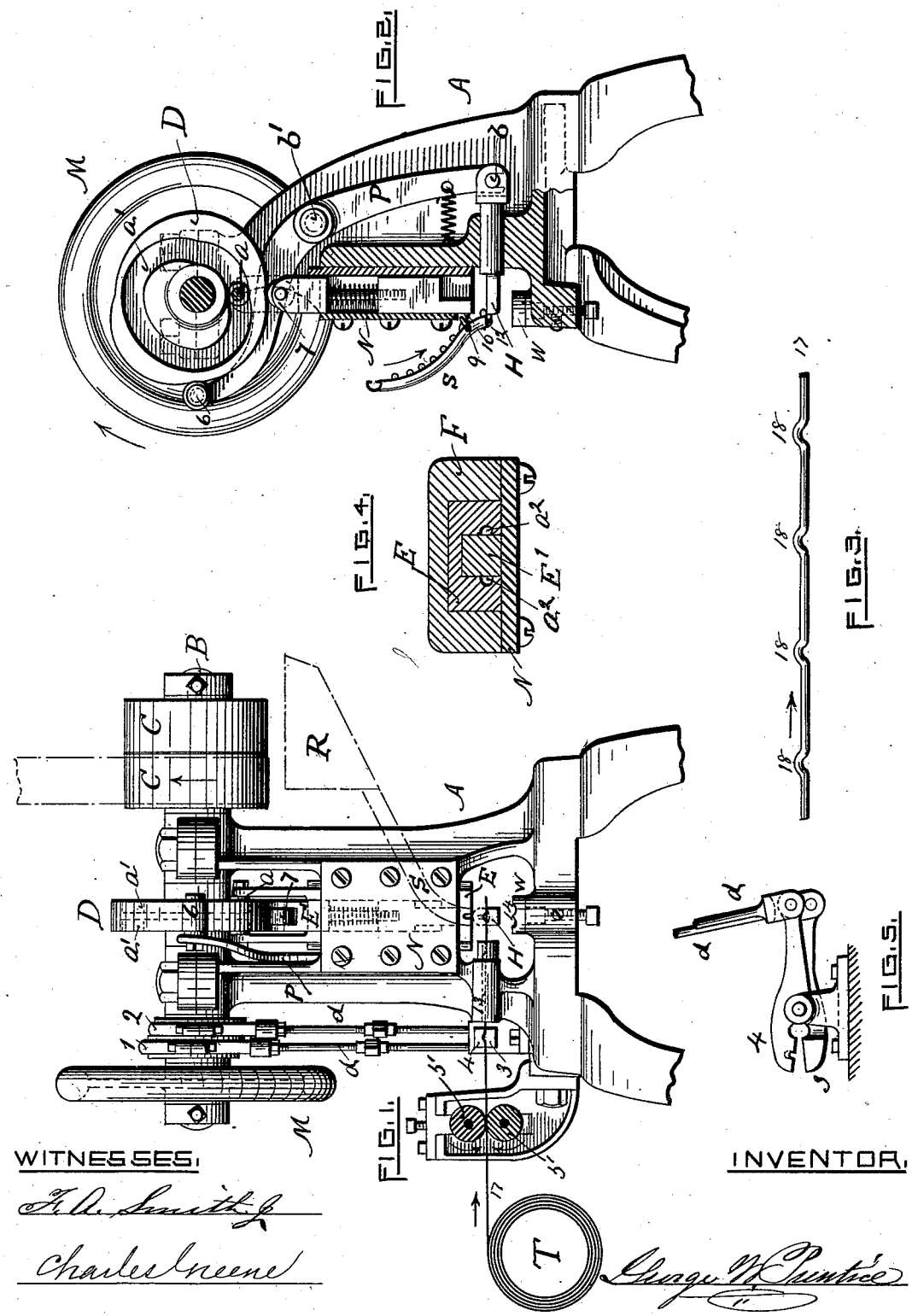

UNITED STATES PATENT OFFICE.

GEORGE W. PRENTICE, OF PROVIDENCE, RHODE ISLAND.

BUTTON-FASTENING MACHINE.

SPECIFICATION forming part of Letters Patent No. 359,631, dated March 22, 1887.

Application filed January 3, 1887. Serial No. 223,281. (No model.)

*To all whom it may concern:*

Be it known that I, GEORGE W. PRENTICE, a citizen of the United States, residing at Providence, in the county of Providence and State of Rhode Island, have invented certain new and useful Improvements in the Art of Securing Eye-Shank Buttons to Fabric; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to a new and useful improvement in the art of securing eye-shank buttons to boots, shoes, and other articles by means of metallic fasteners provided with prongs, which are passed through the fabric and clinched on the under surface thereof to secure the button thereto, the object being to simplify the attachment of buttons by obviating the necessity of providing separate machines for making and attaching the fasteners, as well as to overcome the expense of threading the buttons and fasteners together.

To this end my improvement consists, essentially, in the method of and machine for feeding a length of wire from a coil and forming a loop thereon for the reception of the eye-shank of a button, feeding the buttons one by one into position to receive the looped portion of said wire, feeding said looped portion through the eye-shank of the button until the loop rests in said button-shank, severing the wire and bending said looped portion into a fastener while said loop rests in said button-shank, and securing said button and fastener to fabric by passing the prongs of the fastener through the fabric and clinching them on the under surface thereof, these several operations being accomplished automatically by means of suitable machinery, the details and construction of which will be hereinafter more fully described.

Figure 1 represents a front view, in elevation, of the automatic machine employed in carrying out the several operations of my improvement. Fig. 2 is a vertical sectional view of the same. Fig. 3 is a detached view of a piece of wire, showing loops formed thereon in advance of the cutting and shaping plungers of the machine. Fig. 4 is a horizontal sectional view taken on line *x x* of Fig. 8. Fig. 5 is a detached view showing the means employed for forming the loops. Fig. 6, Sheet 2, is a partial side view showing the wire threaded to the button, the fastener-forming anvil being advanced and the plungers moving downward. Fig. 7 is a corresponding edge or side view showing in addition thereto the button-feeding tube provided with a device for intermittently feeding a button. Figs. 8 and 9 are views similar to Figs. 6 and 7, respectively, showing the central plunger holding the wire in position upon the fastener-forming anvil. Figs. 10 and 11 are similar views showing the wire severed from the coil and bent into a fastener, the fastener-forming anvil being subsequently withdrawn. Figs. 12 and 13 represent the plungers advanced to their limit, and also showing the button withdrawn from the tube and completely attached to the fabric. Fig. 14 is a detached perspective view of a fastener thus automatically made.

In the drawings, A denotes the bed-piece or body of the machine, employed in the present instance in carrying out the several operations of my improvement, said bed-piece or body being provided with the main shaft B, having pulleys C C, by means of which power is transmitted to the machine.

The shaft B is further provided with the cam D, which reciprocates the plungers E and E', and also operates the fastener-forming anvil H, said cam being so constructed as to cause said plungers and anvil to perform their several operations at the proper time to accomplish the desired results.

The shaft B is further provided with eccentrics 1 and 2, which operate the loop-forming jaws 3 and 4, situated at the base of the machine on a line with the anvil H, between said anvil and the feed-rolls 5 5. The main shaft is also provided with a suitable fly-wheel, M, the several parts described being illustrated in Figs. 1 and 2 of the drawings.

Fitted to reciprocate in the vertical guide F in the overhanging portion of the bed-piece A is the fastener-forming plunger E, provided with a vertical groove, in which slides the central plunger, E'. The plunger E is connected to the cam D through the medium of the rolls a, which run in the grooves a', located in each side of said cam, and thereby the proper movement is imparted to the plunger. The lower inner surface of the plunger E is provided with guide-grooves $a^2$, which are of a corresponding form in cross-section to the wire employed. The plungers E and E' are retained in the guide F by means of the plate N, secured to said guide, the relative positions of said plungers being illustrated in cross-section in Fig. 4.

The movement of the plunger E' is accomplished through the medium of the roll 7 on the upper end of the plunger, said roll bearing on the outer edge of the cam D, the lower end of said plunger having a recess formed therein adapted to fit over and embrace the button-shank and the looped portion of the wire from which the fastener is made.

Near the base of the bed-piece A is located the reciprocating anvil H, pivoted at b to the lower end of the lever P, which operates said anvil, said lever being pivoted to the bed-piece at b', the upper end of the lever being provided with a roll, 6, which bears against the outside edge of the cam D, the action of said cam moving said anvil laterally back and forth in its bearing, the front end of the anvil H being of the same width as the inside width of the fastener to be formed, as shown in Fig. 2 of the drawings.

The bed-piece A is further provided with a suitable button-hopper, R, having a feed-tube, S, the lower end of which is located adjacent to the front of the plunger E', and so situated that the eye-shank of the lower button will be presented in position in said tube to receive the wire from which the fastener is made, the buttons being intermittently released and allowed to drop into position in the lower end of said feed-tube by means of the button-stop 8, located on said feed-tube, said button-stop being operated through the medium of the lever 9 by contact with the lug 10, located on the plunger E. The lower end of the feed-tube S is provided with a spring, 12, which retains the lower button in position in said feed-tube, as shown in Figs. 2 and 7 of the drawings.

The loop-forming jaws 3 and 4 are located at the lower left-hand side of the bed-piece A, and are reciprocated by the eccentrics 1 and 2 on the main shaft B through the medium of the adjustable connecting-rods d d, the inner faces of each jaw being formed, the one with a projection, the other with a corresponding depression adapted to receive and bend or form a loop at regular distances on the wire. The bed-piece A is provided with a guide-slot, 13, formed therein between the jaws 3 and 4 and the anvil H, said slot being provided with a presser, 15, provided with a spring, 16, said presser adapted to yield upward and allow the looped wire to pass through the guide-slot at each movement of the feed-rolls 5 5, located on the outer side of the machine, the wire being supplied from the coil T, as shown in Fig. 1.

The base of the bed-piece A is provided with a clinching-block, W, located under the plunger E', said block being provided with clinching-recesses 14, formed in its upper face, said recesses being adapted to deflect and bend the prongs of the fastener after the same has been passed through the material to secure the button thereto.

The machine being organized substantially as described, the operation of making and attaching the fastener is as follows: The free end of the wire 17, which is taken from the coil T, is first passed through the feed-rolls 5 5, which are so constructed as to feed said wire a given distance. Power being now applied, the machine is set in motion, which causes the feed-rolls to feed the wire between the jaws 3 and 4, and said jaws, on being closed by the eccentrics 1 and 2, form the loop 18 on said wire for the reception of the eye-shank of the button, said jaws forming a loop at each revolution of the machine. This operation is repeated until the free end of the wire has reached the inner end of the guide-slot 13, through which it is passed, the wire in said slot having now a series of loops, 18, formed thereon, as shown in Fig. 3 of the drawings, also in dotted lines in Fig. 1. The last revolution of the machine having fed the wire into position to be passed through the button, said button is now allowed to be released and to slide down the feed-tube S against the spring 12 by the action of the lug 10 against the button-stop lever 9, the eye-shank of said button resting on top of the anvil H and in line with the free end of the wire 17, said anvil at this time being advanced to its extreme forward position. A further movement of the machine feeds the free end of the wire through the button-eye until the first loop on the wire rests therein, as illustrated in Figs. 6 and 7. The cam D at this junction commences to move the plunger E' downward until it clamps the wire 17 against the top of the anvil H on each side of the loop 18, the end of said plunger straddling said loop and the button-eye, as shown in Figs. 8 and 9. The peculiar form of the groove a' in the cam D now causes the plunger E to remain stationary, the outside edge of the cam at this point commencing to operate the plunger E, moving it downward. The lower left-hand corner of said plunger, being in advance of the lower face, forms a cutter to sever the wire which protrudes from the guide-slot 13. The movement of the plunger being continued after severing the wire, the ends of said severed piece on each side the loop in the button-eye are bent downward against the sides of the anvil H, thus forming the fastener. The anvil H is now withdrawn, leaving the fastener with the button connected thereto in the guide-grooves $a^2$, the button being still retained in the feed-tube S, as shown in Figs. 10 and 11. A further movement of the cam D now operates both plungers E and E', which move downward simultaneously, carrying with them the button and fastener, the spring 12 releasing said button from the feed-tube S. The downward movement of the plungers are continued until the plunger E reaches the fabric 19, which has been placed in position on the clinching-block W, when it ceases, having reached its extreme limit. The plunger E' continues to move downward, carrying the button and fastener, forcing the prongs of said fastener through the fabric 19 and against the clinching-recesses 14, which causes said prongs to be deflected and bent against the under surface of the fabric, thus securing the button thereto, the grooves $a^2$ in the plunger E serving as a guide to keep the fastener in an upright position, as well as to insure an inward clinching of the prongs, as fully shown in Figs. 12 and 13.

The end of the plunger E, resting on the fabric, clamps it lightly against the top of the block W, and thereby retains said fabric in a smooth condition while the fastener is being secured thereto. The fastener and button being secured to the fabric, the plungers both move simultaneously until they reach their upward limit. The anvil H moves forward at the proper time. The button in the feed-tube S is dropped against the spring 12 and into position to receive the free end of the wire 17, and the same movements are again repeated, as previously described, each series of movements making a complete fastener, and with said fastener securing a button to fabric.

The buttons being automatically placed in position to be connected to the fastener to be made obviates the necessity of handling each button separate, while the loops being formed previous to being placed in the button-eye insures a uniformity of size and shape, and the general construction of the fastener-attaching mechanism insures the attachment of the button to fabric in the quickest and best possible manner.

The form of fastener thus described as automatically made and attached to fabric is shown in Fig. 14 in a detached perspective view, and comprises a loop portion for the reception of the eye of a button, and having a shoulder or table on each side thereof, terminating in a prong for attachment to the fabric. Other forms of fasteners may, however, be made with equal results.

If deemed preferable, the loops 18 may be made at given distances on the entire coil of wire, and the wire then fed through the button-eye and the fastener formed and attached as herein described, thus doing away with the loop-forming mechanism of the machine.

Having described my invention, I claim—

1. That improvement in the art of making button-fasteners and securing eye-shank buttons to fabric which consists in feeding a length of wire from a coil, forming loops at intervals on said wire for the reception of the shank of a button, intermittently feeding buttons from a hopper and presenting their shanks in position to receive the loop of said wire, feeding the free end of said wire through the shank of the button until the loop rests in said shank, severing the wire and bending the free ends into a fastener while said loop rests in said button-shank, and securing the button and fastener to fabric by passing the prongs of said fastener through said fabric and clinching them on the under surface thereof, the several operations being accomplished automatically, substantially in the manner herein set forth.

2. The improvement herein described of making button-fasteners, consisting of forming a loop on a length of wire for the reception of the eye-shank of a button, passing said wire through a button-shank until the loop rests therein, severing said wire, and bending the free ends downward to form penetrating prongs for attachment to fabric while said loop rests in said button-shank, substantially as specified.

3. The machine herein described for automatically making fasteners and securing buttons to fabric, comprising mechanism, substantially as described, for intermittently feeding a length of wire from a coil, forming loops thereon, and feeding the free end of said wire through the shank of a button, mechanism for intermittently feeding buttons and presenting their shanks in position to receive the looped portion of said wire, mechanism, substantially as described, for severing said wire and bending the free ends downward to form prongs for attachment to fabric, while one of said loops rests in a button-shank, and securing said button and fastener to fabric by passing the prongs of the fastener through the fabric and clinching them on the under surface thereof, the whole combined, arranged, and adapted for use substantially as described.

4. In a machine for securing buttons to fabric, the combination, substantially as herein described, of a bed-piece or frame provided with a wire-feeding mechanism, reciprocating plungers, and an anvil for making a wire-fastener, a clinching-die for securing said fastener to fabric, and a button hopper or receptacle provided with a feed-tube having thereon a device for intermittently dropping buttons so that their shanks are presented in position to receive said wire previous to being formed into a fastener, substantially as herein set forth.

5. In a machine for attaching buttons to fabric, the combination, substantially as herein described, of two reciprocating plungers, one within the other, the outer plunger being provided with internal guide-grooves on opposite sides for the reception of the legs of a fastener, the inner plunger being provided on its lower end with a corresponding groove and a vertical slot adapted to straddle the crown of the fastener, and a button-eye, said plungers being operated by a cam or other reciprocating device, a clinching mechanism for bending and securing the prongs of the fastener to fabric, and a button-hopper provided with a feed-tube and a stop, whereby buttons are intermittently dropped into position to receive a length of wire previous to its being formed into a fastener and secured to fabric, substantially as and for the purpose specified.

6. In a machine for attaching buttons to fabric, the plungers E and E', provided with grooves $a^2$, and the cam D, in combination with the reciprocating anvil H and lever P, formed as described, as and for the purpose set forth.

7. In a machine for attaching buttons to fabric, the bed-piece or frame A, having main shaft B, provided with cam D and eccentrics 1 and 2, said bed piece being further provided with feed-rolls 5 5, loop-bending jaws 3 and 4, reciprocating plungers E and E', anvil H, clinching-block W, provided with dies 14, and the button-hopper R, provided with feed-tube S, the whole combined, arranged, and adapted for use substantially as described.

8. In a machine for attaching buttons to fabric, the guide F, having plungers E and E', the former provided with internal grooves, $a^2$, the end of the plunger E' being provided with a corresponding groove and a vertical slot adapted to straddle a button-eye and the crown of a fastener, in combination with the clinching-dies 14, or equivalent clinching device, arranged for use substantially as described.

In testimony whereof I affix my signature in the presence of two witnesses.

GEORGE W. PRENTICE.

Witnesses:
F. A. SMITH, Jr.,
CHARLES GREENE.